(12) United States Patent
Mainville

(10) Patent No.: US 7,810,207 B2
(45) Date of Patent: Oct. 12, 2010

(54) CLEANING ASSEMBLY FOR A SHAFT

(76) Inventor: Luc Mainville, 433, Rue Chicoutimi, Joliette (Quebec) (CA) J6E 8P3

( * ) Notice: Subject to any disclaimer, the term of this patent is extended or adjusted under 35 U.S.C. 154(b) by 1161 days.

(21) Appl. No.: 10/769,320

(22) Filed: Jan. 30, 2004

(65) Prior Publication Data

US 2005/0028313 A1 Feb. 10, 2005

(30) Foreign Application Priority Data

Aug. 4, 2003 (CA) .................................. 2436372

(51) Int. Cl.
*B08B 9/023* (2006.01)
(52) U.S. Cl. ................. 15/256.5; 15/104.04
(58) Field of Classification Search ................ 15/256.5, 15/104.04
See application file for complete search history.

(56) References Cited

U.S. PATENT DOCUMENTS

| | | | |
|---|---|---|---|
| 2,693,377 A * | 11/1954 | Wurzburger | ................. 285/343 |
| 2,772,105 A | 11/1956 | Wyse | |
| 3,559,540 A | 2/1971 | Sheldon | |
| 3,622,251 A | 11/1971 | Allen | |
| 4,035,109 A | 7/1977 | Draft et al. | |
| 4,169,637 A | 10/1979 | Voitas | |
| 4,401,307 A | 8/1983 | Dechavanne | |
| 4,478,285 A | 10/1984 | Caldwell | |
| 4,577,363 A | 3/1986 | Wyse | |
| 4,616,987 A | 10/1986 | Boyers et al. | |
| 5,051,039 A | 9/1991 | Heiliger | |
| 5,058,487 A | 10/1991 | Faitel | |
| 5,090,711 A | 2/1992 | Becker | |
| 5,133,563 A | 7/1992 | Casellato | |
| 5,137,285 A | 8/1992 | Pick | |
| 5,172,450 A | 12/1992 | Cole et al. | |
| 5,535,588 A | 7/1996 | Peterson et al. | |
| 5,593,378 A | 1/1997 | Dyck | |

(Continued)

FOREIGN PATENT DOCUMENTS

BE 412110 12/1935

(Continued)

OTHER PUBLICATIONS

Supplementary European Search Report for EP 04 76 1610, Jan. 16, 2008.

(Continued)

*Primary Examiner*—Randall Chin
(74) *Attorney, Agent, or Firm*—Briggs and Morgan, P.A.

(57) ABSTRACT

An assembly of tubular sections each telescopically arranged in a tubular housing, each of the tubular sections having one end provided with a cylinder head, and comprising an inner tubular member telescopically displaceable in an outer tubular member respectively, such as a telescopic cylinder, a tubular section comprising a sealing joint between the outer tubular element and the inner tubular member in translation inside the outer tubular element, a pipe wiper, and a blade positioned in series in relation to the pipe wiper, wherein the blade has a sharp cutting edge and is mounted by adjusting a tool angle thereof and a pressure it creates on an outer surface of the inner tubular member so that when sliding on this outer surface it removes contaminants such as organic and mineral material off the outer surface.

9 Claims, 3 Drawing Sheets

U.S. PATENT DOCUMENTS

| | | | |
|---|---|---|---|
| 6,073,538 A * | 6/2000 | Tomesani | 92/155 |
| 6,125,819 A | 10/2000 | Strieber et al. | |
| 6,328,004 B1 | 12/2001 | Rynhart | |
| 2001/0039875 A1 | 11/2001 | Pecca et al. | |
| 2002/0065450 A1 | 5/2002 | Ogawa | |

FOREIGN PATENT DOCUMENTS

| | | |
|---|---|---|
| CA | 2167796 | 2/1995 |
| JP | 60018664 | 1/1985 |
| WO | WO 01/76758 | 10/2001 |

OTHER PUBLICATIONS

Melvin Brown: "Seals and Sealing Handbook" Elsevier Advanced Technology, 1995 pp. 289, 290.

Hugo Bouchter: "Industrial Sealing Technology" Wiley, 1974 pp. 281.

* cited by examiner

CLEANING ASSEMBLY FOR A SHAFT

FIELD OF THE INVENTION

The present invention relates to shafts. More specifically, the present invention is concerned with a cleaning assembly for a shaft.

BACKGROUND OF THE INVENTION

Telescopic cylinders consist of a series of telescopically arranged tubular sections with a cap closing a first end of each section. A second end of each section is mounted with a two-piece cylinder head while an inner tubular member has a plunger pin eye which threads into the tube section. The cylinder heads are threadedly mounted to an outer wall at the second end of each section; they are provided with dynamic and static seal means for sealing and with scraper means for removing debris from a surface along which the dynamic seal means slidably contacts.

Industrial telescoping cylinders may be exposed to a wide range of contaminants, especially when provided on refuse collection trucks or garbage compactors for example. In refuse collection trucks, organic or mineral substances tend to adhere and accumulate on exposed surfaces of the vehicles, such as surfaces of sections of cylinder heads of the telescoping cylinders, where they cook under the action of heat. Such substances stick to surfaces of the cylinder heads and result in rapid damages of the sealing joints thereof, which may result in premature spills and leaks.

Benjamin et al., in the U.S. Pat. No. 4,168,837, disclose a scraper ring for a shaft, which has a scraping edge formed by pinching or piercing a brass member. Wyse, in the U.S. Pat. No. 4,577,363 describes a scraper ring formed of two semi-circular mating sections made of a metal such as brass or bronze, or formed of a rigid high strength plastic material, intended to clean a piston rod of a hydraulic cylinder exposed to dirt, mud and ice for example. Such scraper rings are not satisfactory in application involving industrial telescoping cylinders that are exposed to the wide range of contaminants cooked on a tubular surface as discussed hereinabove.

Therefore, there is a need in the art for an improved cleaning assembly for a shaft such as a cylinder member.

SUMMARY OF THE INVENTION

More specifically, in accordance with the present invention, there is provided a cleaning assembly for a structure made of a series of tubular sections arranged in a tubular housing, each of the tubular sections comprising an inner tubular member displaceable in an outer tubular member respectively, the cleaning assembly comprising at least one blade mounted between the inner tubular member and the outer tubular member; wherein a tool angle of the at least one blade and a pressure the at least one blade creates on an outer surface of the inner tubular member are adjusted by a compressive joint to continuously scrape contaminants off the outer surface of the inner tubular member.

There is further provided a cylinder head having an outer tubular member and an inner tubular member displaceable therein, comprising at least one sealing joint mounted between the outer tubular element and the inner tubular member; a pipe wiper mounted between the outer tubular member and the inner tubular member further toward an open end thereof in relation to the at least one sealing joint, and at least one blade positioned in series and further toward the open end in relation to the pipe wiper; wherein at least one part of an exterior surface of the inner tubular member is hardened and the at least one blade contacts the at least one part of the exterior surface of the inner tubular member with a pressure of at least 10 lb/inch$^2$.

Other objects, advantages and features of the present invention will become more apparent upon reading of the following non-restrictive description of embodiments thereof, given by way of example only with reference to the accompanying drawings.

DESCRIPTION OF EMBODIMENTS OF THE INVENTION

Generally stated, there is provided a cleaning assembly for a shaft or a tubular structure.

For clarity purposes, the invention will be described in relation to a structure made of a series of series of tubular sections telescopically arranged in a tubular housing, each of the tubular sections having one end provided with a cylinder head, and comprising an inner tubular member telescopically displaceable in an outer tubular member respectively, such as a telescopic cylinder for example, intended for use in contaminated environments.

Figure 1:
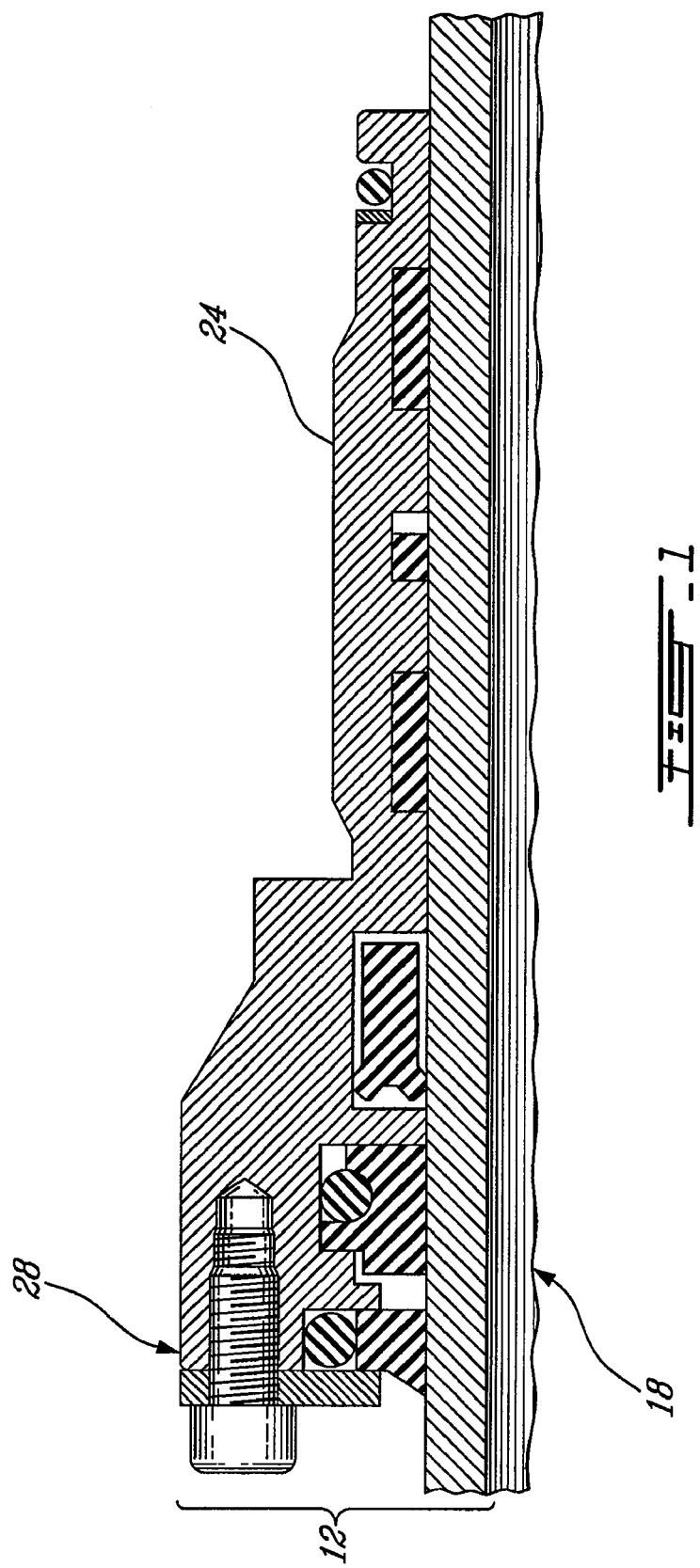
FIG. 1 is a partial longitudinal cross-sectional view of a tubular section.

A telescopic cylinder comprises a series of tubular sections 12, as illustrated in FIG. 1. Each tubular section 12 has one end provided with a cylinder head 28, and comprises an inner tubular member 18 telescopically displaceable in an outer tubular member 24.

Figure 2:
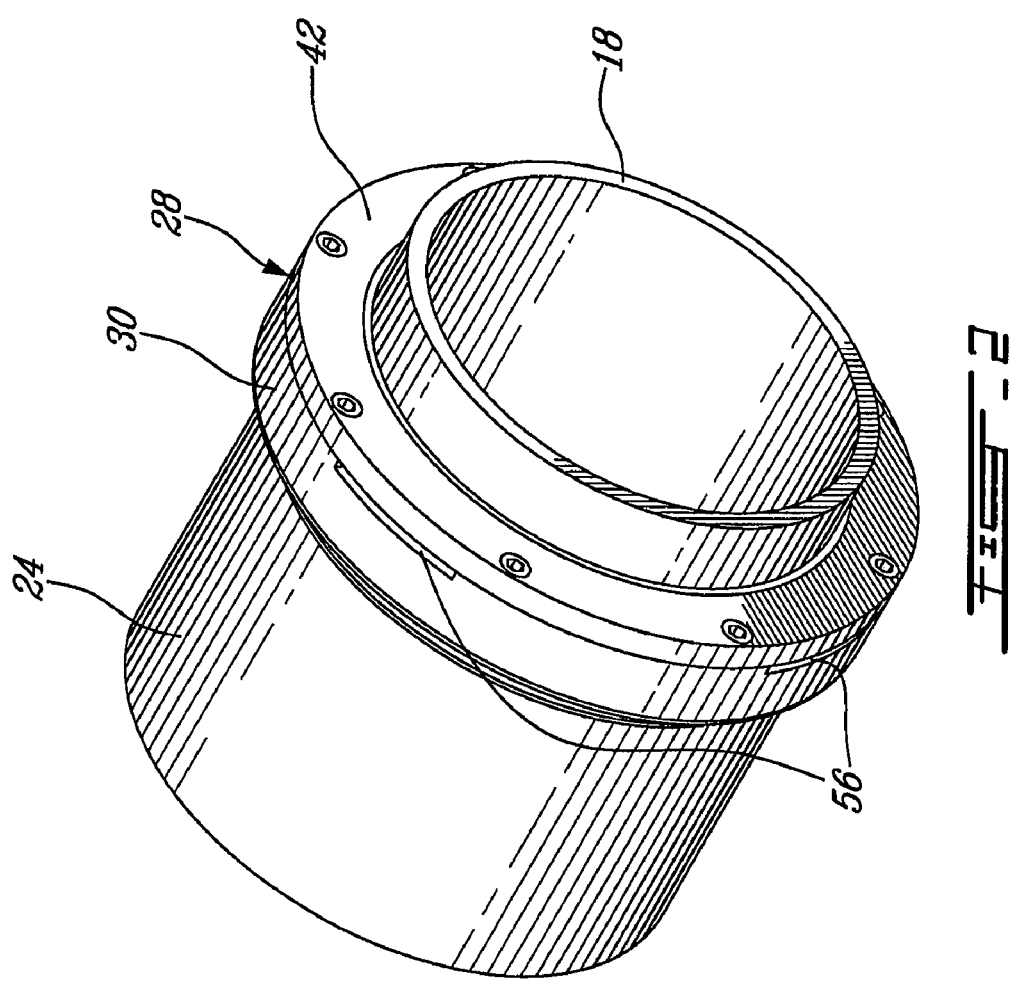
FIG. 2 is a perspective view of an assembly according to an embodiment the present invention.

As best seen in FIG. 2, the cylinder head 28 has an outer wall having an enlarged annular portion 30 A pipe wiper 32 is lodged in a corresponding circumferencial recess in an inner wall of the cylinder head 28, with a sealing joint 38 and a wear ring 40 providing a sealing wall, as is well known in the art. The pipe wiper 32 is separated, by U-cup 37, from a blade 34 inserted into an O-ring joint 36.

Figure 3:
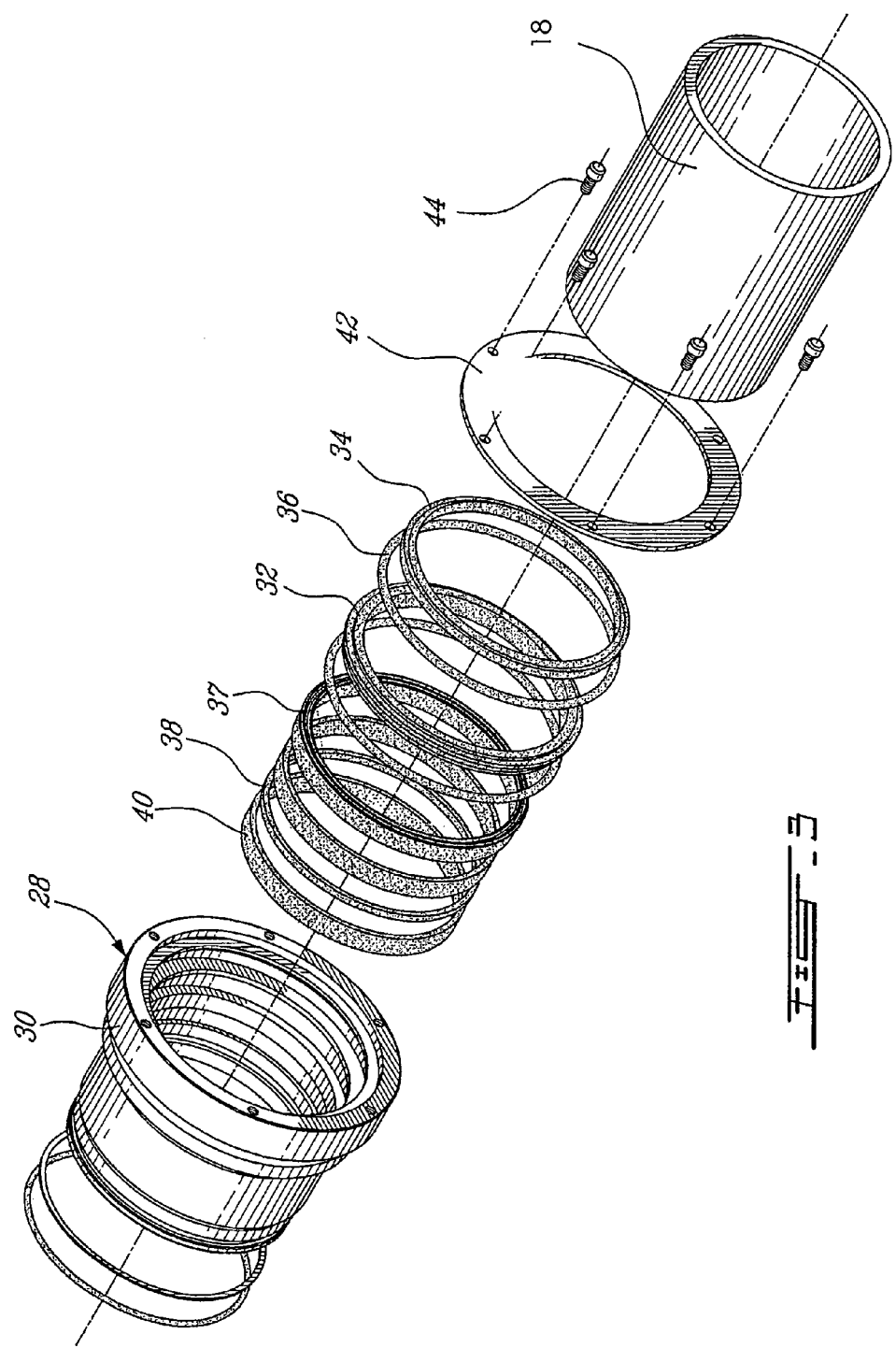
FIG. 3 is an exploded view of the assembly of FIG. 1.

The blade 34 is positioned in series in relation to the pipe wiper 32. It is secured by a flange 42 against a lateral surface of the enlarged annular portion 30 of the cylinder head 28, for example by screws 44 as shown in FIG. 3, so that it slides on an outer surface of the inner tubular member 18, thereby scraping contamination such as organic material or mineral material thereof without allowing them to accumulate on a cutting edge of the blade 34.

The blade is selected to have a sharp cutting edge. The blade is made in a material characterized by a high hardness, such as a material suitable for making cutting tools like a tool steel of a steel M2 type. Alternatively, a coated steel with a hard coating and auto lubricating and anti-adhesive properties, such as D.L.C (Diamond Like Carbon) may be used. DLC are known to have a small coefficient of friction and an excellent surface smoothness; the degree of hardness of the DLC coating is 3,500 to 4,000 HV, and the abrasion resistance is excellent. DLC coatings are known for combining wear resistance, linked to hardness, and self-lubricating capacity. Other hard coatings may be contemplated.

The tool angle of the blade 34, and the pressure with which the blade is in contact with the outer surface of the inner tubular member 18 are adjusted by controlling a compression of the rubber joint element 36 such as a nitrile O-ring joint, so that the pressure exerted by the blade on the outer surface of the inner tubular member 18 is at least 10 lb/inch$^2$.

Such a blade proves to be very efficient in removing cooked organic and mineral contaminants from the outer surface of the tubular member.

In combination with such a cleaning assembly comprising such a scraper blade 34, the outer surface of the tubular member 18 to be cleaned is previously submitted to a hardening treatment such as a nitriding treatment, so as to obtain a higher superficial hardness and an increased resistance to fatigue and surface rubbing, in such a way that a surface finish of the tubular member 18 may be protected against an aggressive action of the scraper blade 34. It is found that the blade of the present cleaning assembly is able to cut away surface defects such as dents or imperfections on such a hardened surface without damaging the surface finish thereof.

People in the art will appreciate that the mounting of the blade may take into account mechanical stability of the overall cylinder assembly, since vibrations for example are to be controlled.

In operation, in a cylinder, when a first tubular member 12 is telescopically displaced outside an inner tubular member 18, the pipe wiper 32, thus protected by a strong blade 34 as described hereinabove, performs a finish work of the outer surface of the inner tubular member 18 by scraping any remaining contamination away outside of the cylinder, after the blade 34 has scrapped off a main part of the contaminants. In absence of the blade 34, these contaminants easily go under a lip of the pipe wiper 32 and are therefore swallowed by the cylinder. The blade 34 prevents such contaminants to enter the cylinder.

As best seen in FIG. 2, discharge apertures 56 may be provided on a periphery of the cylinder head 28 to evacuate the contamination scraped off by the blade 34.

The blade proves to be very efficient in systematically cleaning away organic contamination from inner surfaces of the cylinder.

It may be contemplated to provide a plurality of blades in series, for example secured by the flange 42, to even increase the scraping efficiency.

Alternatively, in a further embodiment of the present invention, a cylinder may comprise a sealing joint or a series of two sealing joints between an outer tubular element thereof and an inner tubular member thereof, and a pipe wiper.

The pipe wiper may be made in urethane and the sealing joint of P.T.F.E (polytetrafluoroethylene) and bronze, or the pipe wiper in P.T.F.E-bronze and the sealing joint of P.T.F.E and carbon fibres for example. Pipe wipers and sealing joints in hydrogenated nitrile (HNBR) may also be used.

The surface finish of the cylinder is selected according to specifications associated with selected pipe wipers as is well known in the art.

It is found that such a cleaning assembly allows a protection against contamination by allowing a tubular surface to be continuously cleaned of contaminants.

Contaminants may comprise organic materials and plastic materials for example.

Although the present invention has been described hereinabove by way of embodiments thereof, it can be modified, without departing from the nature and teachings thereof as defined herein.

The invention claimed is:

1. An assembly of at least one inner tubular member displaceable in an outer tubular member, a surface of the inner tubular member being made of a hardened material, comprising:

at least one blade having a sharp cutting edge, said blade being mounted between said inner tubular member and said outer tubular member, and said blade being made in a hardened material able to cut away cooked contaminants and defects of the hardened material of said inner tubular member while maintaining a surface finish of the inner tubular member; and a compressive joint, said compressive joint supporting said at least one blade in contact with said surface of said inner tubular member;

wherein said at least one blade contacts said surface at an angle and exerts thereon a pressure of at least 10 lb/in$^2$, said angle and said pressure being adjustable through said compressive joint, and said at least one blade thoroughly cleaning the surface of the inner tubular member.

2. The assembly according to claim 1, wherein said compressive joint is a rubber joint.

3. The assembly according to claim 1, wherein said at least one blade is made in a hardened material selected from the group consisting of a tool steel and a coated steel.

4. The assembly according to claim 1, wherein said angle and said pressure are adjusted to continuously remove contaminants adhered to the surface of said inner tubular member.

5. The assembly according to claim 1, further comprising at least one pipe wiper mounted between said inner tubular member and said outer tubular member, said at least one blade being mounted in series with said at least one pipe wiper between said inner tubular member and said outer tubular member.

6. The assembly according to claim 1, said assembly being a cylinder, said cylinder comprising:

at least one sealing joint mounted between the outer tubular member and the inner tubular member; and a pipe wiper mounted between the outer tubular member and the inner tubular member further toward an open end thereof in relation to said at least one sealing joint, said at least one blade being positioned in series and further toward said open end in relation to said pipe wiper.

7. The assembly according to claim 1, wherein said surface of the inner tubular member is nitridation-hardened steel.

8. The assembly according to claim 1, further comprising discharge apertures on a periphery of the outer tubular member to evacuate scraped contaminants and cut surface defects.

9. An assembly of at least one inner tubular member displaceable in an outer tubular member, with a surface of the inner tubular member being made of a hardened material, comprising:

at least one blade having a sharp cutting edge and being mounted between said inner tubular member and said outer tubular member, said at least one blade having a hardness greater than a hardness of said inner tubular member; and a compressive joint, said compressive joint supporting said at least one blade in contact with said surface of said inner tubular member, wherein during operation of said assembly, said at least one blade removes external contaminants deposited on said surface and cuts away portions of the inner tubular member while maintaining a surface finish of said inner tubular member.

* * * * *